United States Patent [19]
Thevenon

[11] Patent Number: 5,629,591
[45] Date of Patent: May 13, 1997

[54] HIGH-AVAILABILITY MULTICURRENT POWER SUPPLY SYSTEM FOR THE TRACTION UNIT OF A RAILWAY LOCOMOTIVE

[75] Inventor: Alain Thevenon, Caluire, France

[73] Assignee: GEC Alsthom Transport SA, Paris, France

[21] Appl. No.: 355,337

[22] Filed: Dec. 12, 1994

[30] Foreign Application Priority Data

Dec. 13, 1993 [FR] France ................... 93 14923

[51] Int. Cl.$^6$ ........................... H02P 1/54
[52] U.S. Cl. ............... 318/107; 318/49; 318/55; 318/112
[58] Field of Search ............ 318/35–113, 798–863; 388/809–815

[56] References Cited

U.S. PATENT DOCUMENTS

| | | | |
|---|---|---|---|
| 3,718,846 | 2/1973 | Bejach | 318/85 |
| 4,263,535 | 4/1981 | Jones | 318/87 |
| 4,647,824 | 3/1987 | Eichenwald | 318/71 |
| 4,780,650 | 10/1988 | Miyazaki et al. | 318/71 |
| 4,841,202 | 6/1989 | Dishner et al. | 318/111 X |

FOREIGN PATENT DOCUMENTS

| | | |
|---|---|---|
| 0383971A1 | 8/1990 | European Pat. Off. . |
| 0514580A1 | 11/1992 | European Pat. Off. . |

OTHER PUBLICATIONS

G. Wiegner, "GTO–Stromrichter Fur Bahnen", *Zev Glasers Annalen*, vol. 113, No. 6/7, Jul. 1989, DE pp. 259–272.

*Primary Examiner*—David S. Martin
*Attorney, Agent, or Firm*—Sughrue, Mion, Zinn, Macpeak & Seas

[57] ABSTRACT

A system for powering a multicurrent locomotive having 2N motors where N is greater than or equal to 2, the system comprising 2N pairs of voltage converters respectively associated with the 2N motors, each motor $M_i$ being powered by means of an inverter connected to the terminals of a parallel capacitor. When the locomotive is powered with AC, then each of the pairs forms a 4-quadrant converter in which the two portions are implemented by the secondary winding of a transformer whose primary winding is connected directly to the terminals of the AC power supply. When the locomotive is powered with DC, the switches serve to use the voltage converters either as voltage-lowering choppers or as voltage-raising choppers. The power supply system is designed in such a manner that in the event of a converter or an inverter failing, it suffices to isolate the failed element to conserve the functions that remain. Availability is thus considerably improved since even in the event of a failure, tractive effort is conserved from at least three motors.

8 Claims, 3 Drawing Sheets

HIGH-AVAILABILITY MULTICURRENT POWER SUPPLY SYSTEM FOR THE TRACTION UNIT OF A RAILWAY LOCOMOTIVE

The present invention relates to supplying electrical power to traction units in general, and more particularly to a multicurrent power supply system for a locomotive that is adapted both to regions having DC power and to regions having AC power, the system being a high-availability system.

BACKGROUND OF THE INVENTION

In France, and in other countries, the electrical power available to the railway network varies depending on region. In general, there are regions provided with 25 kV AC power at 50 Hz, or 15 kV AC at 16.67 Hz, and regions provided with DC power at a voltage that is either 3 kV or else 1.5 kV.

To enable trains to travel equally well over all such regions, it is necessary to provide multicurrent locomotives, i.e. locomotives capable of taking power equally well from AC and from DC.

Multicurrent locomotives started to become genuinely successful with the use of converters based on gate turnoff (GTO) thyristors, as described in the article "Convertisseurs á GTO pour transports ferroviaires" [GTO converters for rail transport] by G. Wiegner, published in the journal ZEV, July 1989. That article shows that GTO thyristors have made it possible to develop so-called 1-quadrant, 2-quadrant, or 4-quadrant converters suitable for converting power supply current whether AC or DC into chopped current that is applied directly to the input of inverters that control the motors of the locomotive.

Thus, as explained in that article, the ICE machine of West German railways uses 4-quadrant power converters to supply AC, in which the midpoints of the two pairs of GTO thyristors are interconnected by the secondary winding of a transformer whose primary winding is connected to the AC power supply network.

Similarly, that article mentions series 252 bicurrent locomotives of Spanish railways (RENFE) using three 4-quadrant converters to supply AC, in which two of the converters are used as voltage-lowering choppers when running under a DC power supply at 3 kV.

Unfortunately, in that type of locomotive, each bogey includes two motors powered by a set of two or three converters and one or two inverters. The converters and the inverters of a single bogey have points in common (filter capacitors, GTO control, etc.) such that any failure causes tractive effort to be lost from both motors in the same bogey (where the most common failure of a converter is short circuiting between its three outputs). For a locomotive fitted with four motors, a failure thus leads to 50% of the effort being lost. When the locomotive is heavily loaded, it thus becomes incapable of finishing off the service. This disturbs the timetable for the train concerned and also disturbs other trains.

OBJECTS AND SUMMARY OF THE INVENTION

That is why a first object of the invention is to provide a multicurrent power supply system having at least four motors in which the motors continue to be powered even in the event of a voltage converter failing.

Another object of the invention is to provide a multicurrent power supply system for four motors that conserves the effort from all four motors in the event of a converter failing, and that makes effort available from three of the motors in the event of an inverter or a motor failing.

In a first aspect, the invention thus provides a multicurrent power supply system for a locomotive having 2N motors, where N is greater than or equal to 2, the system comprising 2N pairs of voltage converters respectively associated with the 2N motors, each of said motors being powered by means of an inverter connected to the terminals of a parallel capacitor and each of said pairs of converters comprising a first voltage converter and a second voltage converter which are connected in parallel with the terminals of said parallel capacitor. When the locomotive is to be powered with AC, the midpoint of the first voltage converter in each pair of converters is connected to the midpoint of the second converter of the same pair in such a manner as to enable each of the pairs of converters to form a 4-quadrant converter, said connection being implemented via the secondary winding of a transformer whose primary winding is connected directly to the terminals of an AC power supply and a section switch in the closed position.

When the locomotive is to be powered with DC, and for i such that $1 \leq i \leq N$, the motors $M_{2i}$ are all connected in parallel and the motors $M_{2i-1}$ are likewise all connected in parallel; the midpoints of the first and second converters in each pair $2i-1$ of voltage converters are connected to the pair $2i$ of voltage converters via respective inductors, and the midpoints of the first and second converters of each pair $2i$ of voltage converters are connected to the pair $2i-1$ of voltage converters via respective inductors.

A switch associated with each of said pairs of voltage converters makes the following possible:

a) in a first position to connect each of said pairs $2i$ or $2i-1$ of voltage converters as a voltage-lowering chopper for the motor $M_{2i-1}$ or $M_{2i}$ respectively, when the DC power supply voltage of the locomotive is greater than the voltage required across the terminals of each of said motors; and b) in a second position, to connect each of said pairs $2i$ or $2i-1$ of voltage converters as a voltage-raising chopper for the motor $M_{2i-1}$ or $M_{2i}$ respectively when the DC power supply voltage feeding the locomotive is less than the voltage required across the terminals of each of said motors.

The system of the invention also includes a switch associated with each pair i of voltage converters for disconnecting the pair in the event of failure.

In a second aspect, the invention also provides a multicurrent power supply system for a locomotive having 2N motors, where N is greater than or equal to 2, the system comprising 2N pairs of voltage converters respectively associated with the 2N motors, each of said motors being powered by means of an inverter connected to the terminals of a parallel capacitor and each of said pairs of converters comprising a first voltage converter and a second voltage converter which are connected in parallel with the terminals of said parallel capacitor. When the locomotive is to be powered with AC, the midpoint of the first voltage converter in each pair of converters is connected to the midpoint of the second converter of the same pair in such a manner as to enable each of the pairs of converters to form a 4-quadrant converter, said connection being implemented via the secondary winding of a transformer whose primary winding is connected directly to the terminals of an AC power supply and a section switch in the closed position.

When the locomotive is powered with DC and assuming that i is such that $1 \leq i \leq N$, a) if the power supply voltage that is greater than the power supply voltage of said motors:

i) the midpoint of the first converter of each pair 2i–1 of voltage converters is connected to the high potential point of the pair 2i of voltage converters via an inductor and the midpoint of the first converter of each pair 2i of voltage converters is connected to the low potential point of the pair 2i–1 of voltage converters via an inductor;

ii) the midpoint of the second converter of each pair 2i–1 of voltage converters is connected to the high potential point of the pair 2i+2 of voltage converters via an inductor and the midpoint of the second converter of each pair of voltage converters 2i is connected to the low potential point of the pair 2i+1 of voltage converters via an inductor; and iii) the midpoint of the second converter of the pair 2N–1 of voltage converters is connected to the high potential point of the pair 2 of voltage converters via an inductor and the midpoint of the second converter of the pair 2N of voltage converters is connected to the low potential point of the pair 1 of voltage converters via an inductor;

such that said voltage converters operate as voltage-lowering choppers; and b) if the power supply voltage is lower than the power supply voltage of said motors, the midpoints of the first and second converters of each pair 2i–1 of voltage converters are connected to the low potential point of the pair 2i of voltage converters via respective inductors, and the midpoints of the first and second converters of each pair 2i of voltage converters are connected to the high potential point of the pair 2i–1 of voltage converters via respective inductors.

BRIEF DESCRIPTION OF THE DRAWINGS

The invention will be better understood on reading the following description made with reference to the accompanying drawings, in which.

MORE DETAILED DESCRIPTION

Figure 1:
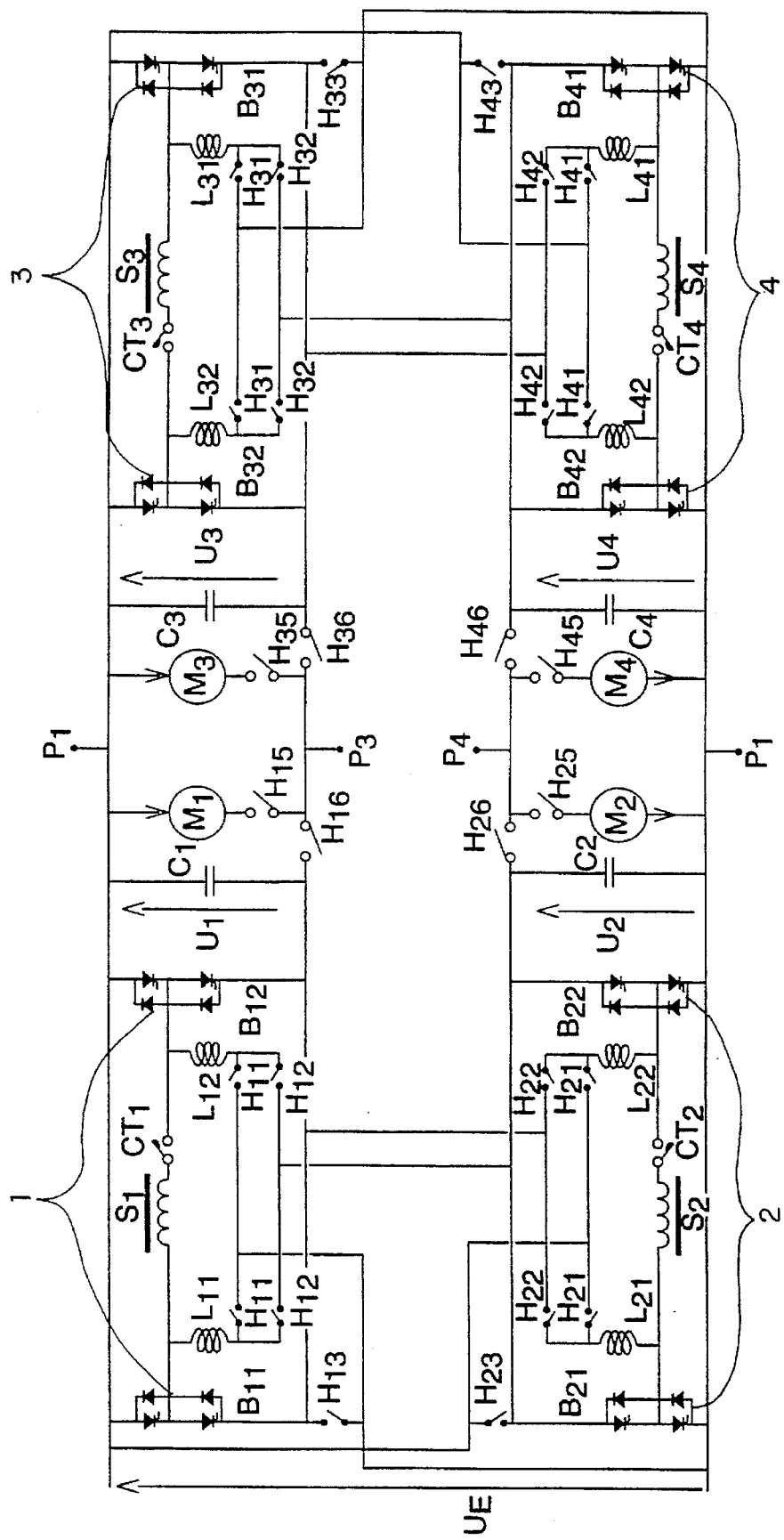
FIG. 1 is an overall circuit diagram of a first four-motor embodiment of the multicurrent power supply system of the invention.
Figure 2:
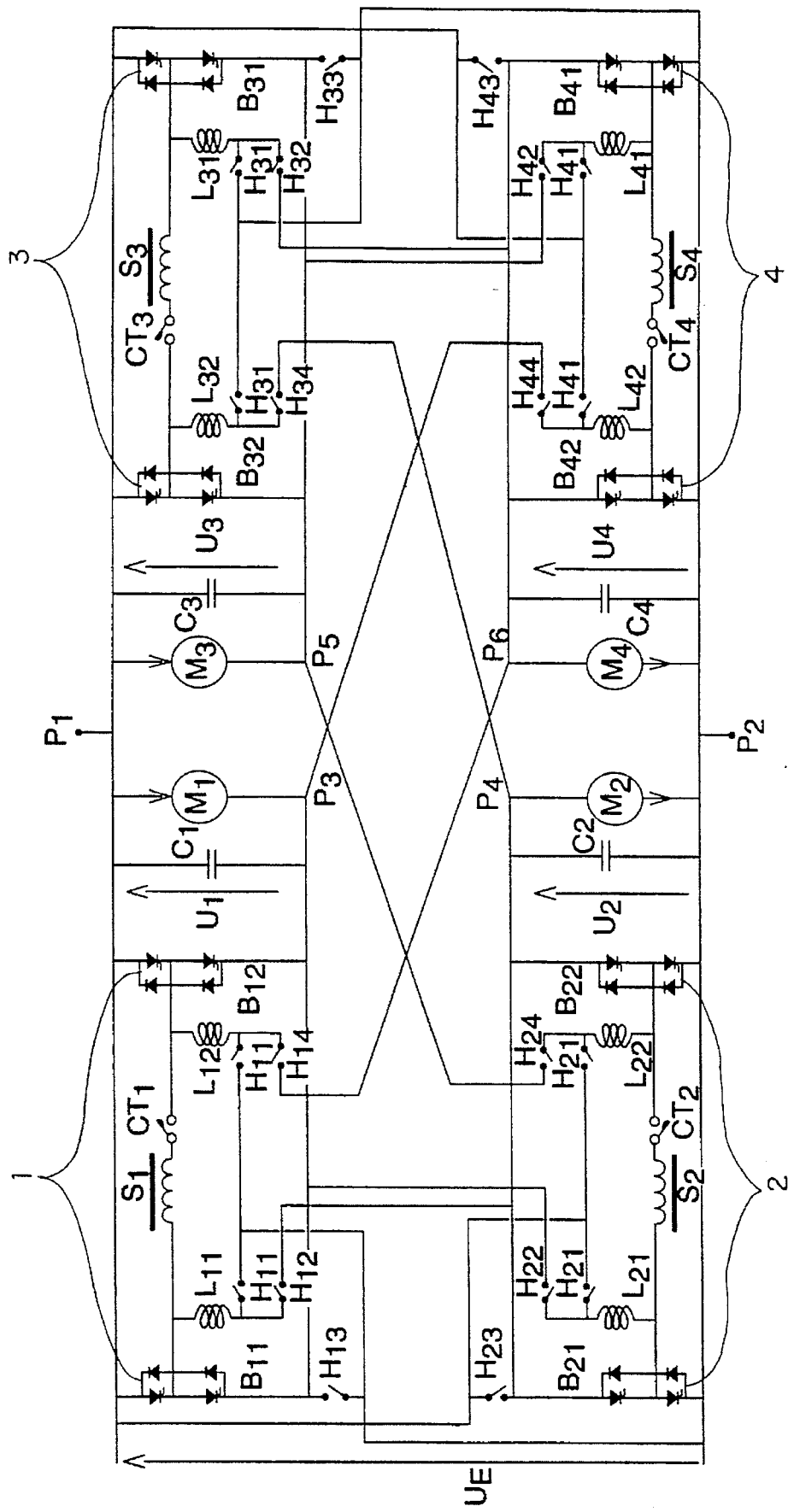
FIG. 2 is an overall circuit diagram of a second four-motor embodiment of the multicurrent power supply system of the invention.

The two embodiments of the present invention shown in FIGS. 1 and 2 have four motors each represented by a circle. In fact, each circle represents a unit comprising both a motor and its associated inverter, which unit is not part of the invention and is therefore not described further in the present description.

In the first embodiment shown in FIG. 1, it will be observed firstly that the switches (often referred to as section switches) $H_{i5}$ and $H_{i6}$, where i takes any value in the range 1 to 4, are always in the closed position except in the event of failure of certain elements of the system, as explained below. In this embodiment, two motors $M_1$ and $M_2$ are connected in parallel between points $P_1$ and $P_3$, and the other two motors $M_2$ and $M_4$ are connected in parallel between the points $P_2$ and $P_4$. Each motor is supplied with a voltage received across the terminals of a parallel capacitor charged to $U_1$ for the motor $M_1$, $U_2$ for $M_2$, $U_3$ for $M_3$, and $U_4$ for $M_4$.

The circuit feeding each capacitor associated with a motor is mainly constituted by a pair of voltage converters. Thus, converters $B_{11}$ and $B_{12}$ are connected in parallel across the terminals of capacitor $C_1$. Each of these voltage converters is of the GTO thyristor type enabling the output voltage taken from their midpoint to be imposed because of the control signals applied to the gates of the thyristors. The gate of each of the two thyristors of the converter is controlled in opposition to the other by a logic signal that is at fixed frequency and that is pulse width modulated by a mean value lying in the range 0 to 1, thereby making it possible to obtain an output voltage whose value is a function of the width of the pulses of the control signal applied to the gates of the thyristors. This technique is well known and is explained in numerous specialized works, and also in the above-cited article; it is therefore not explained in greater detail in the present description. Nevertheless, it should be noted that although using thyristors is the preferred way of implementing voltage converters as used in the present invention, any other switching system that accomplishes the same function as the thyristors could naturally be used.

As already mentioned, the locomotive may be in a region where the power supply is AC, e.g. at 25 kV and at 50 Hz. Under such circumstances, the two converters in a single pair of converters are united to form a 4-quadrant converter as is well known in the art. Thus, the two converters $B_{11}$ and $B_{12}$ have their midpoints interconnected, on closure of switch $CT_1$ via the secondary winding $S_1$ of a transformer whose primary winding is directly connected to the source of AC.

Similarly, switches $CT_2$, $CT_3$ and $CT_4$ are also closed, and the midpoints of the other pairs of converters are interconnected via respective secondary windings $S_2$, $S_3$, and $S_4$ of the same transformer whose primary winding is fed from the AC source as received from the catenary.

It should be observed that when the power supply is AC, then all of the switches $H_{i1}$, $H_{i2}$ for i=1 to 4, are open.

It should also be observed that the four motors are connected in parallel by closing the switches $H_{13}$, $H_{23}$, $H_{33}$, and $H_{43}$ such that the motor power supply voltages $U_1$, $U_2$, $U_3$ and $U_4$ are identical. By interlacing the chopping of the converts $B_{i1}$, $B_{i2}$, this makes it possible to reduce the root mean square (rms) current passing through the capacitors $C_i$.

When the locomotive is in a region where the power supply is DC, then the first embodiment of the system operates as follows.

If the region is powered with DC at 3 kV which is greater than the nominal voltage required for powering the motors (which nominal voltage is generally 2.8 kV), then the converters are caused to operate as voltage-lowering choppers. Under such circumstances, the midpoint of voltage converter $B_{11}$ and the midpoint of voltage converter $B_{12}$ are both connected, by closing switch $H_{12}$, to the line which corresponds to the point at potential $P_4$ via respective inductors $L_{11}$ and $L_{12}$. Similarly, the midpoint of voltage converter $B_{21}$ and the midpoint of voltage converter $B_{22}$ are both connected, by closure of the switch $H_{22}$, to the line corresponding to the point at potential $P_3$ via respective inductors $L_{21}$ and $L_{22}$. Likewise, the midpoint of voltage converter $B_{31}$ and the midpoint of voltage converter $B_{32}$ are both connected, on closure of switch $H_{32}$, to the line corresponding to potential $P_4$ via respective inductors $L_{31}$ and $L_{32}$; finally the midpoints of voltage converters $B_{41}$ and $B_{42}$ are connected on closure of the switch $H_{42}$ to the line corresponding to the point at potential $P_3$ via respective inductors $L_{41}$ and $L_{42}$.

As shown in FIG. 1, the voltage received from the DC power supply is $U_E$ between points at potentials $P_1$ and $P_2$, where $P_2$ may be ground potential. Given the above-described configuration of the converters as voltage-lowering choppers, the points $P_3$ and $P_4$ are at potentials intermediate between 0 and 3 kV. Although this characteristic does not form part of the invention, it is worth recalling that in the voltage-lowering chopper configuration, converter $B_{11}$, for example, provides a voltage at the output of the inductor $L_{11}$ that is provided to charge the capacitor $C_2$ to the voltage $U_2$ relative to the potential $P_2$ (which may be considered as being 0), which potential is less than the voltage $U_E$ and depends on the widths of the control pulses applied to the gates of the thyristors constituting the converters in application of the coefficient $\alpha$ lying in the range 0 to 1. This results from the fact that:

$$U_2 = U_E - U_1 + \alpha U_1$$

since $$U_1 = U_2, \text{ then}$$

$$U_1 = U_E - U_1 + \alpha U_1$$

i.e.

$$U_2 = U_1 = U_E/(2-\alpha)$$

It may be observed that control can be applied so as to obtain a constant voltage $U_1$ (or $U_2$) regardless of fluctuations in the power supply voltage $U_E$.

If the locomotive should now find itself in a region powered by DC but at a voltage of 1.5 kV, i.e. a voltage less than the nominal voltage to be supplied to the motors, then the converters are required to operate as voltage-raising choppers. Under such circumstances, the midpoints of voltage converters $B_{11}$ and $B_{12}$ are interconnected, and because the switch $H_{11}$ is closed ($H_{12}$ being open), they are connected via their respective inductors $L_{11}$ and $L_{12}$ to the line corresponding to the point at potential $P_2$. Simultaneously, the midpoints of voltage converters $B_{21}$ and $B_{22}$ are interconnected, and because the switch $H_{21}$ is closed ($H_{22}$ remaining open) they are connected to the line corresponding to the point at potential $P_1$ via their respective inductors $L_{21}$ and $L_{22}$.

Similarly, the midpoints of voltage converters $B_{31}$ and $B_{32}$ are interconnected, and because the switch $H_{31}$ is closed, they are connected to the line corresponding to the point at potential $P_2$ via their respective inductors $L_{31}$ and $L_{32}$. Simultaneously the midpoints of the converters $B_{41}$ and $B_{42}$ are interconnected and, because the switch $H_{41}$ is closed, they are also connected to the line corresponding to the point at potential $P_1$ via their respective inductors $L_{41}$ and $L_{42}$.

As mentioned for the case where the converters are connected as a voltage-lowering chopper, the power supply voltage as applied between the points $P_1$ and $P_2$ is $U_E$. However, this time the points $P_3$ and $P_4$ are at potentials lying outside the range $P_1$ to $P_2$. Although the operation of a voltage-raising chopper is known and does not form part of the invention, it is appropriate to recall how it operates. Thus, the converter $B_{21}$ operates in this case to provide a capacitor charge voltage $U_1$ which is greater than the input voltage $U_E$ and which depends on the width of the control pulses applied to the gates of the thyristors constituting the converter, by applying thereto a coefficient $\alpha$ lying in the range 0 to 1, such that:

$$U_1 \cdot \alpha = U_E$$

i.e.

$$U_1 = U_E/\alpha$$

The embodiment described above presents several advantages over power supply systems of the prior art. Firstly, if one of the motors breaks down, it is possible to isolate it by opening the associated switch, i.e. $H_{15}$ for $M_1$, $H_{25}$ for $M_2$, $H_{35}$ for $M_3$, or $H_{45}$ for $M_4$. This makes it possible to keep the other three motors in operation.

However, and above all, in the event of one of the voltage converters failing, then that failure does not stop the entire system as was the case in the prior art. When a converter breaks down, it usually becomes a short circuit. Assuming that the faulty converter is $B_{11}$ or $B_{12}$, then the effect of the short circuit is to reduce the voltage $U_1$ to zero. It is therefore necessary to open the switches (or section switches) $H_{11}$, $H_{12}$, $H_{13}$, $H_{16}$, and $CT_1$ (when the power supply is AC) to isolate the faulty converters and continue to have four motors available. This operating principle applies in similar manner when the faults relate to a converter associated with any one of the other three motors, by opening the appropriate set of switches $H_{i1}$, $H_{i2}$, $H_{i3}$, $H_{i6}$, and $CT_i$.

In the circuit shown in FIG. 1, the distribution that is Preferably adopted for the motors consists in having motors $M_1$ and $M_2$ on one bogey and motors $M_3$ and $M_4$ on the other bogey. However, other motor distributions are naturally possible without going beyond the ambit of the invention.

Although the system shown in FIG. 1 has four motors, it is possible to generalize the above circuit to 2N motors. For each additional pair of motors it then suffices to connect motor $M_{2i-1}$ and the associated assembly comprising the parallel capacitor and the pair of converters between the points $P_1$ and $P_3$, and to connect the motor $M_{2i}$ together with its parallel capacitor and the associated pair of converters between the points $P_2$ and $P_4$. The connections between the pairs of converters associated with each additional pair of motors are made in the same way as shown in FIG. 1 as described with reference to the first embodiment. In other words, each additional branch having two motors comprises switches, inductors, and voltage converter elements identical to those to be found in the branch constituted by motors $M_1$ and $M_2$.

It may be observed that in a circuit having 2N motors, the failure of a motor or of a converter makes it possible to continue using at least 2N−1 motors by applying the same operating principles as those described with reference to FIG. 1.

The second embodiment of the present invention is described below with reference to FIG. 2.

Unlike the first embodiment of FIG. 1, in this embodiment, the motors are no longer connected in parallel in pairs, but are independent of one another. However, as before, each motor is powered by a voltage received from the terminals of a parallel capacitor, $U_1$ for motor $M_1$, $U_2$ for $M_2$, $U_3$ for $M_3$, and $U_4$ for $M_4$.

The circuit feeding each capacitor associated with a motor is the same as in the first embodiment. As described above, although it is preferable to use thyristors in implementing the voltage converters, it is clear that any other switching system that performs the same function as thyristors could be used.

When the locomotive is in a region where power is supplied as AC (25 kV at 50 Hz), the converters are connected in the same way as in the first embodiment, i.e.

the switches or section switches $CT_i$ and $H_{i3}$ for i lying in the range 1 to 4 are closed, while the switches $H_{i1}$ and $H_{i2}$ are all open. Operation is the same as in the first embodiment.

When the locomotive is in a region where the power supply is DC, then the second embodiment of the system operates as follows.

If the region is powered at a DC voltage of 3 kV, i.e. a voltage greater than the nominal voltage required for powering the motors, which voltage is generally 2.8 kV, then the converters are called on to operate as voltage-lowering choppers. Under such circumstances, the midpoint of voltage converter $B_{11}$ is connected, by closure of switch $H_{12}$, to the line corresponding to the point at potential $P_4$ via inductor $L_{11}$, and the midpoint of voltage converter $B_{12}$ is connected, by closure of switch $H_{14}$, to the line corresponding to the point at potential $P_6$ via inductor $L_{12}$.

Simultaneously, the midpoint of voltage converter $B_{21}$ is connected, by closure of switch $H_{22}$, to the line corresponding to the point at potential $P_3$ via inductor $L_{21}$, and the midpoint of voltage converter $B_{22}$ is connected, by closure of switch $H_{24}$, to the line corresponding to the point at potential $P_5$ via inductor $L_{22}$.

Similarly, the midpoint of voltage converter $B_{31}$ is connected, by closure of switch $H_{32}$, to the line corresponding to the point at potential $P_6$ via inductor $L_{31}$, and the midpoint of voltage converter $B_{32}$ is connected, by closure of the switch $H_{34}$, to the line corresponding to the point at potential $P_4$ via the inductor $L_{32}$.

Simultaneously, the midpoint of voltage converter $B_{41}$ is connected, by closure of the switch $H_{42}$, to the line corresponding to the point at potential $P_5$ via inductor $L_{41}$, and the midpoint of voltage converter $B_{42}$ is connected, by closure of the switch $H_{44}$, to the line corresponding to the point at potential $P_3$ via the inductor $L_{42}$.

As shown in FIG. 2, the voltage received from the DC power supply source is $U_E$ between the points at potentials $P_1$ and $P_2$, where $P_2$ may be ground potential. Because the converters in the circuit shown in FIG. 2 are voltage-lowering choppers, points $P_3$, $P_4$, $P_5$ and $P_6$ are at potentials intermediate between $P_1$ and $P_2$. The known operation of the converters as voltage-lowering choppers has already been outlined with reference to FIG. 1 and there is no need to do so again.

Should the locomotive now be found in the region under DC power, but at a voltage that is lower than the nominal voltage that ought to be fed to the motors, then the converters are connected so as to operate as voltage-raising choppers. Under such circumstances, there is no point in describing the connections established since they are the same as those established in the first embodiment as described with reference to FIG. 1 when its converters are used as voltage-raising choppers.

As already mentioned, when the converters are connected so as to operate as voltage-lowering choppers, the voltage applied between the points $P_1$ and $P_2$ is $U_E$, however the points $P_3$, $P_4$, $P_5$ and $P_6$ are at potentials lying outside the range $P_1$ to $P_2$. Not only is the operation of converters as voltage-raising choppers known, it has already been recalled succinctly above when describing the first embodiment with reference to FIG. 1. Unlike the first embodiment, the power supply voltage for the four motors is controlled independently for each of them. That is shy, unlike the embodiment of FIG. 1, the embodiment of FIG. 2 does not have switches or section switches $H_{i5}$ and $H_{i6}$ (where i lies in the range 1 to 4) serving to isolate a motor Mi in the event of failure, either of the motor itself or of a converter associated with the motor, e.g. a failure constituted by a short circuit. In the event of such a failure, the locomotive still has three of its four motors available.

As already mentioned when describing FIG. 1, the distribution that is preferably adapted for the motors consists in having motors $M_1$ and $M_2$ on one of the bogeys and $M_3$ and $M_4$ on the other bogey. However other distributions of the motors are possible without going beyond the scope of the invention.

Figure 3:
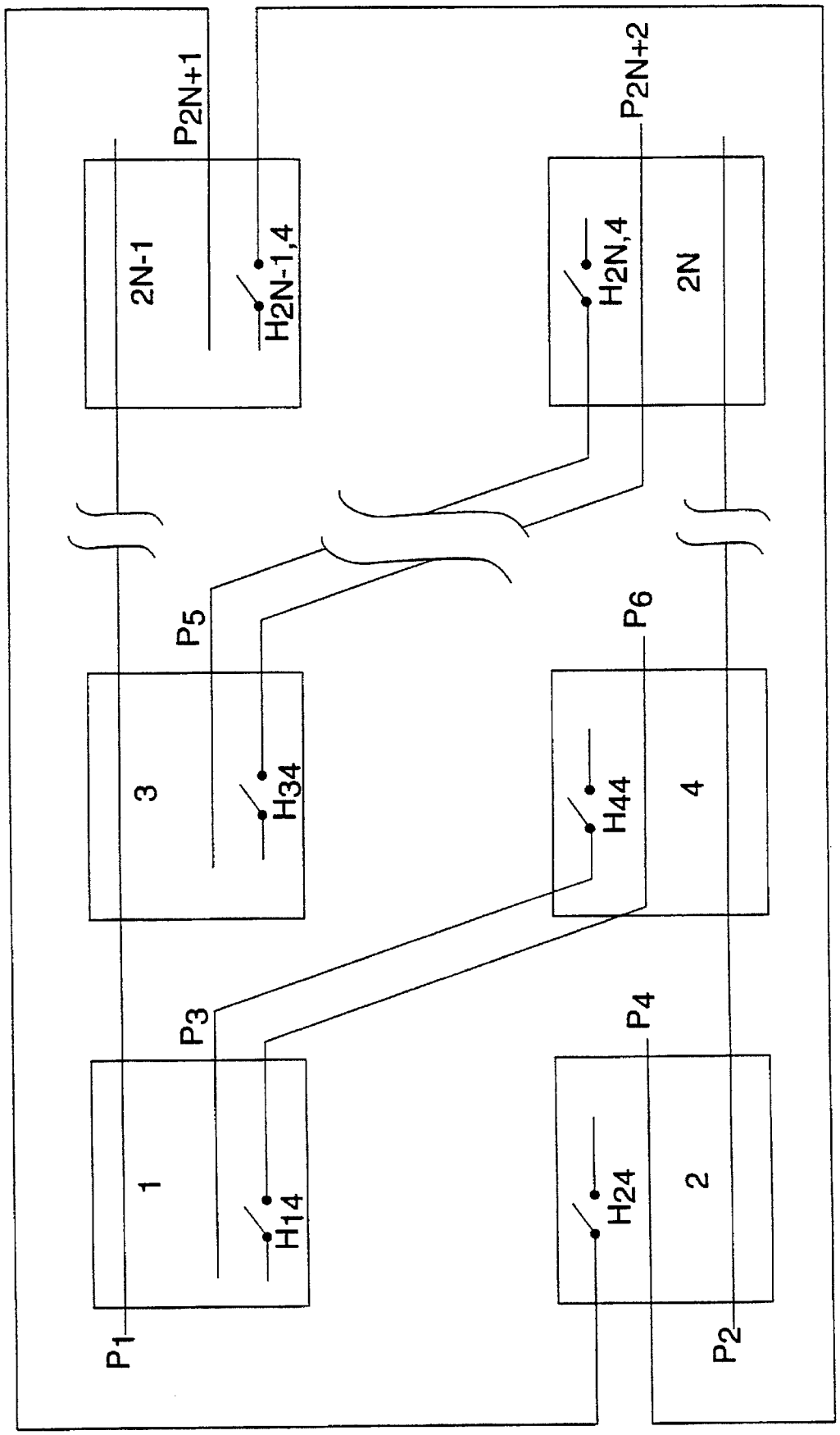
FIG. 3 is a block diagram of the second embodiment of FIG. 2 extended to 2N motors.

Although the embodiment described with reference to FIG. 2 has only four motors, it is possible to generalize this embodiment to 2N motors, as illustrated in FIG. 3.

The connections causing the converters to operate as voltage-raising choppers present no problems in the event of adding two additional motors since the connections are established between pairs of converters associated with the two additional motors. Thus, in FIG. 3, the connections (not shown) for connecting the converters as voltage-raising choppers are between group 1 and group 2, between group 3 and group 4, . . . , and between group 2N−1, and group 2N.

In contrast, when the converters are connected as voltage-lowering choppers, only two connections are implemented between two facing groups, i.e. between group 1 and group 2, . . . , and group 2N−1 and group 2N. But two other connections are implemented as shown in FIG. 3. Group 1 is connected via switch $H_{14}$ to the line of group 4 that corresponds to the point at potential $P_6$, and group 4 is connected via switch $H_{44}$ to the line of group 1 that corresponds to the point at potential $P_3$, and so on, up to group 2N−3 which is connected via switch $H_{2N-3,4}$ to the line of group 2N that corresponds to the point at potential $P_{2N+2}$, and group 2N is connected via switch $H_{2N,4}$ to the line of group 2N−3 corresponding to the point at potential $P_{2N-1}$. Finally, group 2N−1 is connected via switch $H_{2N-1,4}$ to the line of group 2 that corresponds to the point at potential $P_4$, and group 2 is connected via switch $H_{24}$ to the line of group 2N that corresponds to the point at potential $P_{2N+2}$.

It should be observed, that in the event of a circuit having 2N motors, such as that shown in FIG. 3, the failure of a motor or of a converter makes it possible to continue having at least 2N−1 motors available by applying the same operating principles as those implemented in the 4-motor circuit of FIG. 2.

I claim:

1. A multicurrent power supply system for a locomotive having 2N (meaning N multiplied by 2) motors $M_1$ through $M_{2N}$ and a plurality of capacitors, where N is an integer greater than or equal to 2, the system comprising 2N pairs of voltage converters respectively associated with the 2N motors and identified sequentially as pair 1 through pair 2N of voltage converters, each of said motors being powered by an inverter connected to the terminals of a respective one of said capacitors which is connected in parallel therewith, and each of said pairs of converters comprises a first voltage converter and a second voltage converter which are connected in parallel with the terminals of one of said capacitors; when the locomotive is to be powered with AC, the midpoint of the first voltage converter in each pair of converters is connected to the midpoint of the second converter of the same pair in such a manner as to enable each of the pairs of converters to form a 4-quadrant converter, said connection being implemented via the secondary winding of a transformer whose primary winding is connected directly to the terminals of an AC power supply and a section switch in the closed position;

wherein, when the locomotive is to be powered with DC, and for i where i is an integer having all values between 1 and N, inclusive the motors $M_{2i}$ (meaning i multiplied by 2) are all connected in parallel and the motors $M_{2i-1}$ (meaning i multiplied by 2, the result minus 1) are likewise all connected in parallel;

the midpoints of the first and second converters in each pair 2i–1 of voltage converters are connected to a respective one of said pairs 2i of voltage converters via respective inductors, and the midpoints of the first and second converters of each pair 2i of voltage converters are connected to a respective one of said pairs 2i–1 of voltage converters via respective inductors; and a switch associated with each of said pairs of voltage converters makes the following possible:

a) when the DC power supply voltage of the locomotive is greater than the voltage required across the terminals of each of said motors, said switch of each said respective one of said pairs 2i of voltage converters connects, in a first position, its respective voltage converter as a voltage-lowering chopper for a respective said motor $M_{2i-1}$, and said switch of each said respective one of said pairs 2i–1 of voltage converters connects, in said first position, its respective voltage converter as a voltage-lowering chopper for a respective said motor $M_{2i}$; and b) when the DC power supply voltage feeding the locomotive is less than the voltage required across the terminals of each of said motors, said switch of each said respective one of said pairs 2i of voltage converters connects, in a second position, its respective voltage converter as a voltage-raising chopper for a respective said motor $M_{2i-1}$, and said switch of each said respective one of said pairs 2i–1 of voltage converters connects, in said second position, its respective voltage converter as a voltage-raising chopper for a respective said motor $M_{2i}$.

2. A system according to claim 1, in which said voltage converters are constituted by GTO thyristors each controlled by a control signal applied to its gate.

3. A system according to claim 1, further comprising a section switch, and when the locomotive is being powered with AC, said section switch is opened in the event of a failure of one of said first and second converters of the second pair of voltage converters associated with said section switch.

4. A system according to claim 1, in which each of said pairs of voltage converters is connected to said associated motor by means of a section switch which is opened when a fault occurs on one of said first and second converters in said pair of voltage converters.

5. A system according to claim 4, in which each of said motors can be totally disconnected from the system by means of a section switch when said motor breaks down.

6. A system according to claim 5, in which each pair of motors $M_{2i-1}$ and $M_{2i}$ is mounted on a single bogey.

7. A system according to claim 6, in which i=2, motors $M_1$ and $M_2$ driving a first bogey and motors $M_3$ and $M_4$ driving a second bogey, such that a failure of one of said voltage converters or of one of said motors enables at least 75% of the nominal power of the system to be conserved and enables both bogeys to be driven in spite of said failure.

8. A multicurrent power supply system for a locomotive having 2N (meaning N multiplied by 2) motors $M_1$ through $M_{2N}$ and a plurality of capacitors, where N is an integer greater than or equal to 2, the system comprising 2N pairs of voltage converters respectively associated with the 2N motors and identified sequentially as pair 1 through pair 2N of voltage converters, each of said motors being powered by an inverter connected to the terminals of a respective one of said capacitors which is connected on parallel therewith, and each of said pairs of converters comprises a first voltage converter and a second voltage converter which are connected in parallel with the terminals of one of said capacitors; when the locomotive is to be powered with AC, the midpoint of the first voltage converter in each pair of converters is connected to the midpoint of the second converter of the same pair in such a manner as to enable each of the pairs of converters to form a 4-quadrant converter, said connection being implemented via the secondary winding of a transformer whose primary winding is connected directly to the terminals of an AC power supply and a section switch in the closed position;

wherein:

a) when the locomotive is powered with DC at a voltage that is greater than the power supply voltage of said motors, and assuming that i takes on all values between 1 and N, inclusive:

i) the midpoint of the first converter of each pair 2i–1 (meaning i multiplied by 2, the result minus 1) of voltage converters is connected to the high potential point of a respective one of said pairs 2i (meaning i multiplied by 2) of voltage converters via an inductor and the midpoint of the first converter of each pair 2i of voltage converters is connected to the low potential point of a respective one of said pairs 2i–1 of voltage converters via an inductor;

ii) the midpoint of the second converter of each pair 2i–1 of voltage converters is connected to the high potential point of a respective one of said pairs 2i+2 of voltage converters via an inductor and the midpoint of the second converter of each pair of voltage converters 2i is connected to the low potential point of a respective one of said pairs 2i+1 of voltage converters via an inductor; and iii) the midpoint of the second converter of the pair 2N–1 of voltage converters is connected to the high potential point of the pair 2 of voltage converters via an inductor and the midpoint of the second converter of the pair 2N of voltage converters is connected to the low potential point of the pair 1 of voltage converters via an inductor;

such that said voltage converters operate as voltage-lowering choppers; and b) when the locomotive is powered with DC at a voltage lower than the power supply voltage of said motors, and still assuming that i takes on all values between 1 and N, inclusive;

the midpoints of the first and second converters of each pair 2i–1 of voltage converters are connected to the low potential point of a respective one of said pairs 2i of voltage converters via respective inductors, and the midpoints of the first and second converters of each pair 2i of voltage converters are connected to the high potential point of a respective one of said pairs 2i–1 of voltage converters via respective inductors; and in such a manner that said voltage converters operate as voltage-raising choppers.

* * * * *